Patented Jan. 1, 1929.

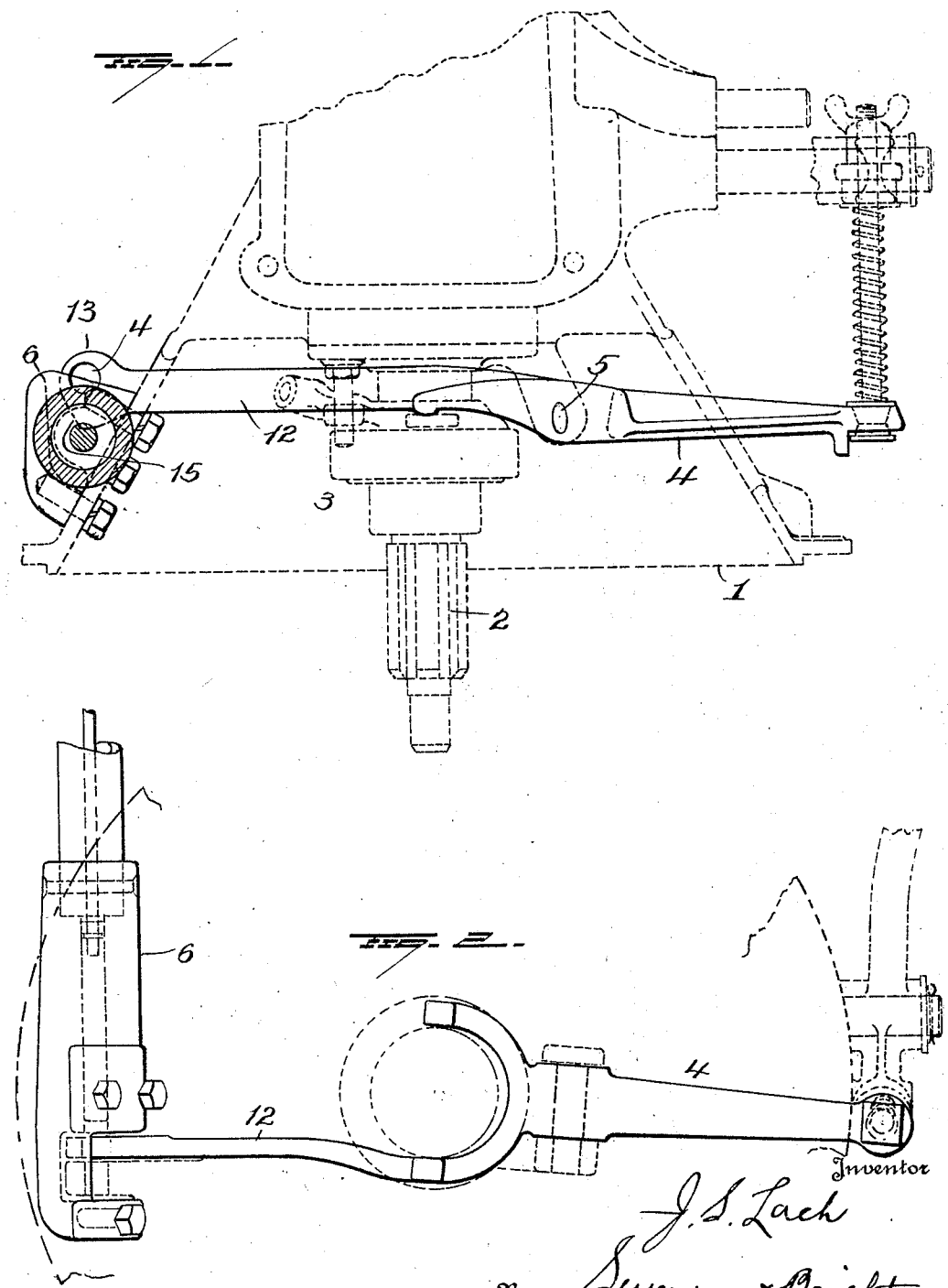

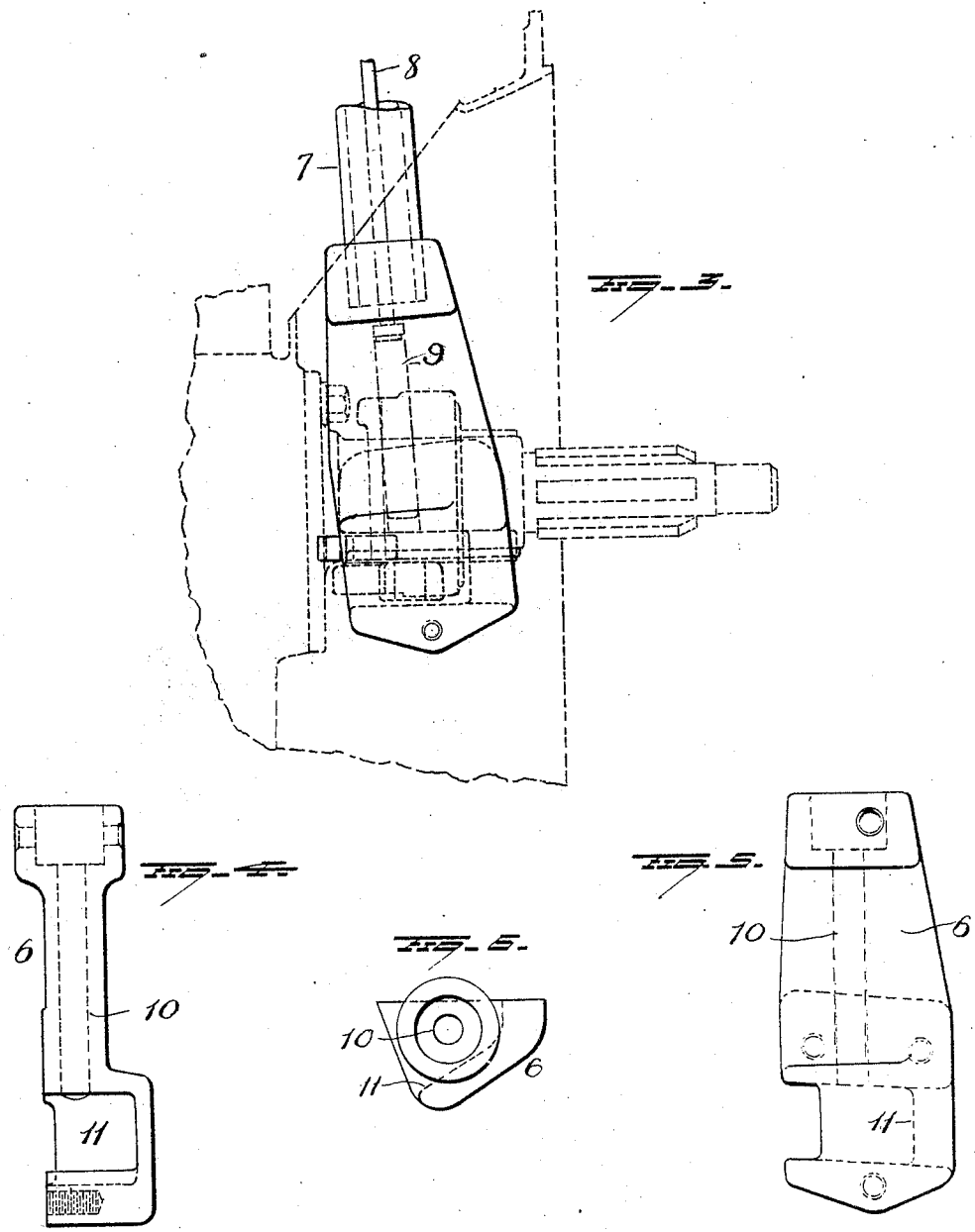

1,697,013

UNITED STATES PATENT OFFICE.

JOSEPH S. LACH, OF BRIDGEPORT, CONNECTICUT, ASSIGNOR TO THE YALE & TOWNE MANUFACTURING COMPANY, OF STAMFORD, CONNECTICUT.

AUTOMOBILE LOCK MEANS.

Application filed August 4, 1926. Serial No. 127,088.

This invention relates to improvements in locking means for automobiles,—one object of the invention being to provide simple and efficient means to lock the clutch operating fork.

With this and other objects in view, the invention consists in certain novel features of construction and combinations of parts as hereinafter set forth and pointed out in the claims.

In the accompanying drawings,—

Figure 1 is a view partly in section and partly in elevation showing an application of my improvements.

Figure 2 is a view at right angles to Figure 1.

Figure 3 is a view in side elevation, and

Figures 4, 5 and 6 are views of the locking bracket.

In Figure 1 of the drawing, a clutch housing is indicated at 1, a clutch shaft at 2 and a clutch operating sliding bearing is shown at 3. A clutch operating fork 4 is pivotally supported at 5 and is operated by a pedal in any approved manner.

A locking bracket 6 is secured to the clutch housing 1 and has secured thereto a tube 7 through which a rod 8 passes, said rod being connected at its lower end with a bolt 9 which is guided through the locking bracket 6, the latter having a bore 10 for the accommodation of said bolt and this bore communicates with a recess 11 in the lower portion of the bracket. One arm of the clutch operating fork 4 is provided with an extension 12 having an enlarged free end 13 which enters the recess 11 in the bracket 6 and said enlarged free end being provided with a hole 14 to receive the bolt 9. When the parts are in normal operative positions, a projection 15 on the extension 12 will be disposed in the path of the bolt 9 so as to prevent the accidental dropping of said bolt. When the clutch is to be locked in inoperative position, the clutch operating fork will be so moved as to bring the hole 4 near the free end of the extension 12 in line with the bolt 9 so that said bolt may pass through said hole and lock the fork against operation.

Suitable means not shown will be provided for controlling the operation of the bolt 9. These means may be key-controlled. The means for controlling the operation of the bolt 9 may be such as fully shown and described in my copending application, Serial No. 127,084, filed simultaneously herewith.

Having fully described my invention what I claim as new and desire to secure by Letters-Patent, is:

1. In automobile lock means, the combination of a clutch operating fork, one arm of which is provided with an extension, and a bolt to have locking relation to said extension to lock said fork.

2. In automobile lock means, the combination of a clutch operating fork provided with an extension having a bolt engaging portion, and a bolt to engage said bolt engaging portion of said extension to lock the clutch operating fork.

3. In automobile lock means, the combination of a clutch operating fork having an extension, a bolt to engage said extension to lock said fork, and a part on said extension to be disposed under said bolt when the fork is in unlocked position.

4. In automobile lock means, the combination of a clutch operating fork provided with an extension to be engaged by a bolt, a bracket having a recess into which said extension enters, said bracket also having a bore communicating with said recess, and a bolt movable through said bore and across said recess to lockingly engage the fork extension.

In testimony whereof, I have signed this specification.

JOSEPH S. LACH.